United States Patent
Schmitt

[15] 3,658,196
[45] Apr. 25, 1972

[54] ELECTROMECHANICAL MECHANISM FITTED ON TRUCK VEHICLES FOR LOADING AND UNLOADING

[72] Inventor: Karl Schmitt, Frankfurter Strasse 13, 64 Fulda, Germany

[22] Filed: Nov. 25, 1969

[21] Appl. No.: 879,707

[30] Foreign Application Priority Data

Dec. 2, 1968   Germany........................P 18 12 172.7

[52] U.S. Cl. ........................................214/77 P, 214/DIG. 10
[51] Int. Cl. .................................................................B60p 1/44
[58] Field of Search ................214/77 P, 77, 80, 78, DIG. 10; 254/184

[56] References Cited

UNITED STATES PATENTS

| 2,271,430 | 1/1942 | Harry | 254/184 |
| 2,370,834 | 3/1945 | Ball | 254/184 |
| 1,495,280 | 5/1924 | Vonnez et al. | 214/77 P |
| 2,350,641 | 6/1944 | Ruddock | 214/77 P |
| 2,589,654 | 3/1952 | Archer | 214/77 P |
| 2,837,227 | 6/1958 | Lugash | 214/77 P |
| 2,979,214 | 4/1961 | Selzer | 214/77 P |
| 3,258,140 | 6/1966 | Appleman | 214/77 P |
| 3,429,464 | 2/1969 | Robinson | 214/77 P |
| 3,498,481 | 3/1970 | Size | 214/77 P |
| 3,522,894 | 8/1970 | Tornheim | 214/77 R X |

FOREIGN PATENTS OR APPLICATIONS 85,758   3/1956   Sweden ..............................214/77 P Primary Examiner—Gerald M. Forlenza
Assistant Examiner—Robert J. Spar
Attorney—Kelman and Berman

[57] ABSTRACT

The gate of a truck is mounted on two parallelogram linkages and raised and lowered by means of an electromotor in circuit with the truck battery, two drums driven by the motor through a spur gear transmission, and a cable or chain wound on each drum and secured to an associated linkage. The gate can be swung between upright and horizontal positions on the linkage, and is spring-biased toward the closed position so that the spring cushions the gate-opening movement.

8 Claims, 10 Drawing Figures

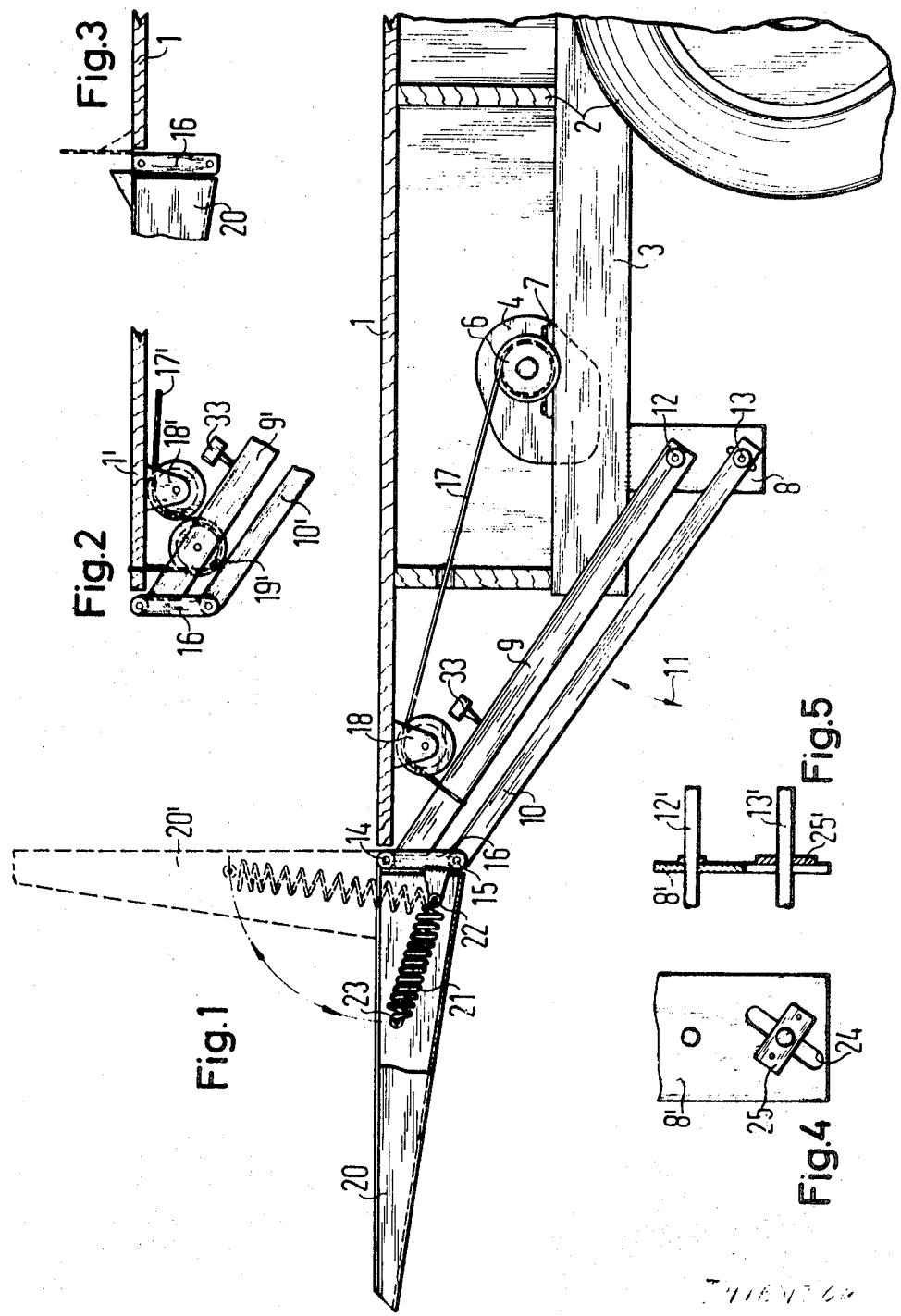

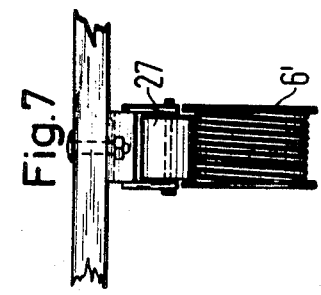
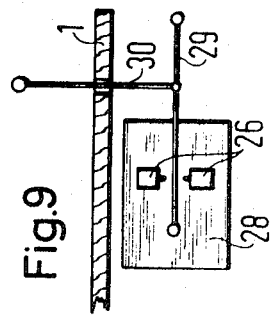
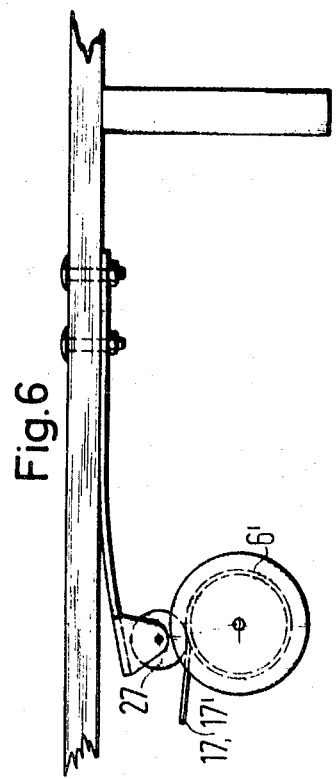
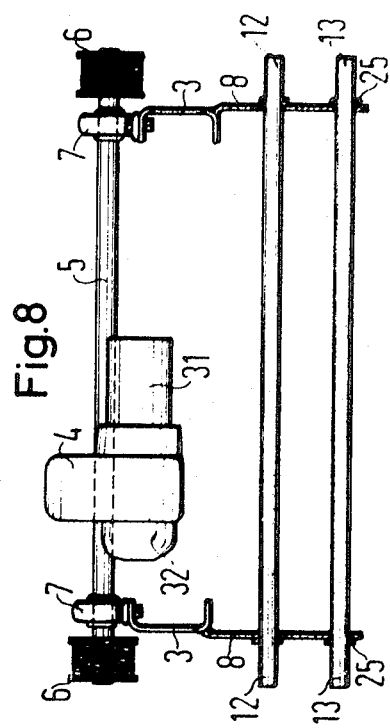

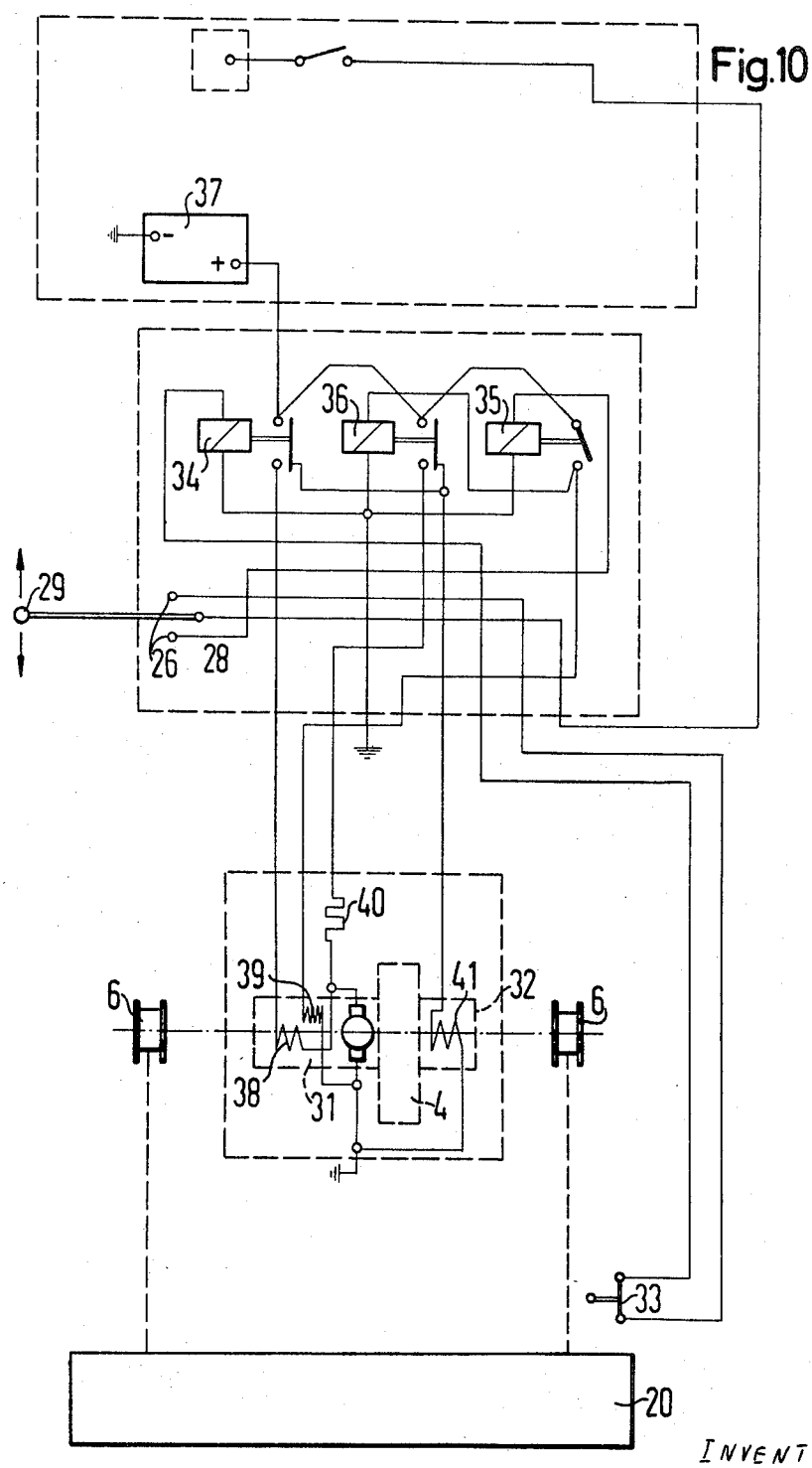

ELECTROMECHANICAL MECHANISM FITTED ON TRUCK VEHICLES FOR LOADING AND UNLOADING

The invention relates to an electromechanical mechanism fitted on truck vehicles for loading and unloading by means of a movable rear wall which is articulately mounted on pivot arms.

Loading walls operated hydraulically and electrohydraulically are known in truck vehicles. In such mechanisms, either the vehicle engine or an electric motor is used to drive a hydraulic pump whose oil pressure is supplied via hoses and conduits to cylinders, moves pistons therein and thus effects the raising or lowering of the loading wall.

A hydraulically operated loading wall driven by the vehicle engine has various disadvantages, for example the fact that the petrol or diesel engine of the vehicle must run continuously and the exhaust gases thereof endanger the operators.

A hydraulically operated loading wall driven by an electric motor also has various disadvantages, for example the fact that due to the interposition of hydraulic units the efficiency of the mechanism is reduced and the current requirement is relatively high; consequently, the battery and dynamo fitted in the vehicle as standard are no longer sufficient and must be replaced by stronger and more expensive types.

The object of the present invention is to use the capacity of the battery fitted as standard in a truck vehicle via a d.c. motor also to actuate a mechanism fitted to the vehicle for loading and unloading the load by means of a movable loading end wall which is articulately mounted on lever arms. For this purpose, a high efficiency and low current consumption is desired. This is obtained by an electromechanical drive which has the following features:

No intermediate power-consuming hydraulic units are used. The loading wall is moved by chains or cables directly by an electric motor drive.

The spur gear transmission chosen not only has the advantage of a high efficiency but also permits utilization of gravity in the downward movement.

The field of the electric motor has a shunt and a series winding. During raising only the series winding is switched in, a torque adapted to the particular load thus being generated.

During the lowering only the shunt winding is switched in, thus preventing the motor from racing, the motor running with substantially constant speed and at a predetermined loading of the platform acting as a generator to produce current which flows back into the battery.

To save current, the wall is not opened and closed electrically or hydraulically; instead, adjustable springs are built into the wall and are compressed during opening, thus taking up the weight of the platform and facilitating closure of the wall.

Also to save current, braking is not effected electrically but by spring force. The latter also has the advantage of operating even on current failure. Only the release of the brake, which requires little current, is effected electrically.

When the motor is switched off during lowering, an initial remanent voltage remains which keeps the brake released longer and thus delays the stopping of the platform. This disadvantage is obviated by the circuit arrangement used.

The mechanism is so constructed that predominantly tensile stresses occur which are taken up by cables or chains. This results in a relatively low weight of the mechanism and a small useful load loss. The light structure of the mechanism requires correspondingly less electrical energy on raising and thus saves current.

The mechanism consists of an electrically controlled low-current electrical-mechanical drive and a truck rear wall suspended on chains or cables and constructed as adjustable platform.

The platform is articulately connected to the upper ends of arms arranged in pairs in parallelogram manner and during opening is supported on pressure springs arranged at that point. Chains or cables engage in the immediate vicinity and lead to chain pinions or cable drums. The latter are mounted on a shaft which is inserted through the hollow shaft of a gear motor and driven thereby. The input shaft of the gear is coupled on the one hand to a spring pressure brake and on the other hand to the electric motor. The chains or cables are advantageously so arranged that they extend beneath the platform of the vehicle. Guide rollers make it possible to chose an optimum location of the electromechanical drive.

According to the invention, the lower pivot arms of the parallelogram guides are adjustable in that the bearing pins may be fixed in arcuate slots of the holding means. Since the circle center lies in the lower articulation of the parallelogram guide on the platform and when the rear wall is open and in the horizontal position the parallelogram articulations on the platform are vertically in line, by adjusting the lower bearing pin in the slot any desired gradual inclination of the platform with respect to the ground may be obtained during the lowering operation.

Arranged above the pivot arms is a limit switch in such a manner that the upper edge of the arms actuates said switch when the arms reach their highest position. A further disconnecting switch is operated when the cables or chains become slack.

An advantageous embodiment of the mechanism according to the invention consists in that the motor and brake are controlled via contactors, the energizing winding of the motor consisting of series and shunt windings, the series winding being switched in only on raising the wall and the shunt winding only on lowering the latter. In addition, during lowering a field-breaking resistance is further momentarily switched into the armature circuit. The brake acts as spring pressure brake and when the motor is switched on is released by an electromagnetic coil.

Further features of the invention will be apparent from the following description of an example of embodiment in conjunction with the drawings and claims.

In the drawings,

FIG. 1 is a fragmentary side elevation of a truck equipped with the movable end wall and the associated electromechanical drive of the invention, FIG. 2 shows a modified detail for the apparatus of FIG. 1 comprising an additional support roller in each case, FIG. 3 is a detail drawing of the support of the end wall on the platform, with the rear wall open and closed, FIG. 4 shows the mounting of the lower end of the arms of the parallelogram guide comprising the slot for adjusting the inclination of the platform with respect to the ground, FIG. 5 is a side view corresponding to FIG. 4, FIG. 6 shows the arrangement of the pressure roller on the cable drum, FIG. 7 is a rear view corresponding to FIG. 6, FIG. 8 is a view of the arrangement of the cable drums with the attachable electric gearmotor, FIG. 9 shows the arrangement of a switch for raising or lowering the end wall and FIG. 10 shows the electrical circuit and control of the electromechanical drive.

Arranged beneath the platform 1 (FIG. 1) of a vehicle 2, preferably at a point between the platform and the chassis 3 which is otherwise unused and is protected, is an attachable gear transmission 4 (FIG. 8) with a motor 31 and a brake 32, said transmission 4 being displaceable on a shaft 5 in such a manner that it may be secured for optimum utilization of the free space available. The shaft 5 is inserted through the hollow shaft of the gear motor jointly constituted by the motor 31 and the gear transmission 4, and driven thereby. The input shaft of the gear transmission is coupled to a spring pressure brake 32 and also to the electric motor 31 in a manner not specifically shown. Disposed at the ends of the shaft 5, which is mounted in bearing blocks 7 on the frame 3, are pinions or cables drums 6. The shaft 5 is so dimensioned in length that it fits the various frame widths of different vehicle makes. The frame 3 carries on both sides holding brackets 8, FIG. 1, to which are articulately secured the parallelogram arms 9, 10 of equal length for pivoting movement in the direction of the arrow 11 about the vertically superposed bearing pins 12, 13. Said arms 9, 10 are articulately connected at their other ends 14, 15 on both sides by joint strips 16 so that when rotation in the direction of the arrow 11 takes place said strips move upwardly or downwardly parallel to each other.

Mounted on the arms 9 as near as possible to the end wall on both sides tension members such as chains or cables 17 (FIG. 1) which lead directly or via guide rollers 18 to pinions or cable drums 6. As shown in FIG. 2 the chains or cables 17' may also be doubled in each case over a support roller 19', thus making it possible to lift twice the load for the same motor power. The pivotal loading or gate 20 is articulately connected to the strip 16 (FIG. 1) at the upper fulcrum 14 in such a manner that said wall may be rotated through 90° about said fulcrum 14.

In FIG. 1, the closed end wall 20' is shown in dash line. To facilitate closure, pressure springs 21 are provided which bear pivotally on the one hand on the bracket 22 of the strip 16 and on the other hand on a mounting 23 on the end wall 20. When the wall 20 is pivoted into the horizontal position, the springs 21 are compressed. When the wall 20 is raised the springs 21 extend and thus facilitate closure. It is sometimes desirable for the open horizontally disposed wall 20 to assume gradually a slightly inclined position with respect to the ground during lowering. This is achieved by a slot 24 in the bracket 8' (FIG. 4) in which the bearing pin 13' (FIG. 5) may be displaced and locked in the desired position by means of plates 25, 25' in which the pin 13' is journaled and which may be fastened to the bracket 8'. The center line of said slot lies on a circular arc through the articulation 13 with the articulation 15 as center. The lowered wall 20 lies parallel to the ground or in an inclined position depending on whether the hinge pin 13 is secured in said slot vertically beneath the center point of the articulation 12 or to the left or right thereof.

If the mechanism is switched off carelessly, the chains or cables 17, 17' may become slack. A pressure roller 27 (FIGS. 6 and 7) arranged resiliently on each drum 6' prevents the chains or cables jumping out of the grooves of the drum 6'. The pressure rollers 27 are not disposed vertically above the cable drums but are offset a small angle in the direction of the cable. The chains or cables are prevented from becoming slack by a limit switch which is actuated by the loose chain or cable.

Overload protection is provided by a non-illustrated slip clutch incorporated between the motor and transmission and a limit switch 33 (FIG. 10) which is attached to the platform 1 in a manner not shown and automatically stops the motor in the upper end position of the arms 9. Raising and lowering is initiated by means of a switch 28 (FIG. 9) by corresponding actuation, i.e. when the hand lever 29 is raised the wall 20 is raised and when said lever is pressed downwards the wall 20 is lowered. This is done via special auxiliary switches 26 lowered. This are mounted on a plate and start the motor 31 and release the brake 32 via contactors 34, 35, 36 (FIG. 10). An extension 30 of the hand lever 29 (FIG. 9) is led upwardly through the platform 1 so that the motor can also be actuated from said platform.

The circuit, proceeding from the battery 37 of the vehicle, is illustrated diagrammatically in FIG. 10. The lever 29 lies in the horizontal position in the neutral position and is connected to the positive terminal of the vehicle battery 37 via the ignition lock thereof. The fixed contact of the circuit 26 for raising the wall, disposed accordingly at the top, is connected via the limit switch 33 to the contactor 34 so that the series winding 38 of the motor 31 is connected in series with the armature, the winding of the electromagnet 41 for releasing the brake 32 being simultaneously energized so that the brake shoes are raised. In the neutral position of the switch lever 29 the winding of the electromagnet is not energized so that the brake shoes are applied by the springs and lock the shaft of the gear. In the lowering position of the switch 26 the contactors 35 and 36 are energized, the shunt winding 39 of the motor 31 being switched in. The electromagnetic coil 41 for releasing the brake 32 is also energized so that the brake shoes are raised. The connection of the contactors 35 and 36 is such that the shunt winding 39 is first energized via the contactor 35, the contactor 36 following. Thus, in the motor 31 the shunt field is first produced and only then is the armature connected, avoiding too high an armature current.

When the motor is switched off from the lowering position, a certain remanence of the shunt field remains and produces in the armature a decreasing voltage which must not be allowed to reach the electromagnet coil 41 for releasing the brake, since this would increase the time for which the brake is released and the braking or stopping would be delayed. Thus, according to the invention in the circuit arrangement the armature circuit is separated from the coil 41 by the contactor 36.

What I claim is:

1. In a truck including a platform, an elongated parallelogram linkage having two longitudinal members and two transverse members at the respective longitudinal end portions of said linkage, one of said end portions being fastened to said platform for arcuate movement of the other end portion, a gate mounted on said other end portion for pivoting movement between a substantially upright position and a normally horizontal position, said gate moving between a raised position at the level of said platform and a lowered position during said arcuate movement, and drive means for arcuately moving said other end portion, the improvement which comprises:

a. compression spring means interposed between said gate and the transverse member of said linkage at said other end portion for biasing said gate toward said upright position;
   b. said drive means including
      1. an electric motor, mounted on said platform, said motor having a series winding and a shunt winding,
      2. an elongated tension member,
      3. a rotatable drum member having an axis drivingly connected to said motor and secured to one longitudinal end of said tension member for retracting and releasing the tension member when said drum member rotates about said axis thereof,
      4. securing means securing the other longitudinal end of said tension member to said other end portion of said linkage for moving said gate between said raised and lowered positions during said rotation of said drum member,
      5. a spur gear transmission operatively interposed between said motor and said drum member,
      6. brake means connected to said transmission and spring-biased toward a locking position for preventing rotation of said drum member,
      7. electrically operated brake release means,
      8. a source of direct current,
      9. respective contactors in circuit with said windings and said source,
      10. means connected to said contactors for energizing said series winding for movement of said gate from said lowered toward said raised position and for energizing said shunt winding for movement of said gate from said raised toward said lowered position,
      11. said brake release means being connected in circuit with said contactors for releasing said brake when either of said contactors energizes said motor,
      12. said source of current being a rechargeable battery and being charged by current generated in said shunt winding during movement of said gate by gravity from said raised to said lowered position.

2. In a truck as set forth in claim 1, said platform supporting a guide roller, said tension member being trained over said guide roller below said platform.

3. In a truck as set forth in claim 1, said securing means including a guide roller on said other end portion, said other longitudinal end of said tension member being trained over said guide roller below said platform and fastened to said platform.

4. In a truck as set forth in claim 1, respective pivots connecting each of said longitudinal members to each of said transverse members, and means for shifting the pivot connecting one of said longitudinal members to the transverse member at said one end portion of said parallelogram linkage in an arc about the pivot connecting said one longitudinal member to the transverse member at said other end portion, and means for fixedly fastening the shifted pivot.

5. In a truck as set forth in claim 1, a pressure roller, and resilient means pressing said pressure roller against a portion of said drum member and a portion of said tension member offset from a vertical plane through said axis in the direction of release of said tension member.

6. In a truck as set forth in claim 1, a shaft rotatably mounted on said platform, said drum being fixedly fastened to said shaft, and said transmission being drivingly connected to said shaft.

7. In a truck as set forth in claim 1, a limit switch mounted on said platform for engagement with a member of said linkage when said gate reaches said raised position, and circuit means connecting said limit switch with said motor for deenergizing the same when said switch is engaged by said member.

8. In a truck as set forth in claim 1, said switch means including means for deenergizing said brake release means when said windings are deenergized.

* * * * *